(12) United States Patent
Bilcke

(10) Patent No.: US 7,088,061 B2
(45) Date of Patent: Aug. 8, 2006

(54) DRIVE SYSTEM FOR A GROUP OF MACHINES

(75) Inventor: Walter Bilcke, Geluveld (BE)

(73) Assignee: Picanol N.V., Ypres (BE)

( * ) Notice: Subject to any disclaimer, the term of this patent is extended or adjusted under 35 U.S.C. 154(b) by 0 days.

(21) Appl. No.: 10/148,215

(22) PCT Filed: Dec. 9, 2000

(86) PCT No.: PCT/EP00/12456

§ 371 (c)(1),
(2), (4) Date: Jun. 10, 2002

(87) PCT Pub. No.: WO01/43270

PCT Pub. Date: Jun. 14, 2001

(65) Prior Publication Data

US 2002/0190671 A1 Dec. 19, 2002

(30) Foreign Application Priority Data

Dec. 10, 1999 (BE) .................................... 9900807

(51) Int. Cl.
*H02P 1/54* (2006.01)
(52) U.S. Cl. ............................ 318/34; 318/41; 318/49; 318/254; 363/67; 363/71; 139/370.1
(58) Field of Classification Search .................. 318/34, 318/41, 49, 254, 138, 439, 172; 363/67, 363/69, 71; 139/1 E, 370.1
See application file for complete search history.

(56) References Cited

U.S. PATENT DOCUMENTS

| | | | | | |
|---|---|---|---|---|---|
| 3,942,085 | A | * | 3/1976 | Tadakuma et al. | 318/341 |
| 4,023,081 | A | * | 5/1977 | Murray et al. | 318/109 |
| 4,503,371 | A | * | 3/1985 | Sugita | 318/443 |
| 4,749,920 | A | * | 6/1988 | Jaeger et al. | 318/112 |
| 5,113,123 | A | * | 5/1992 | Noser et al. | 318/106 |
| 5,166,582 | A | * | 11/1992 | Jaeger et al. | 318/45 |
| 5,311,752 | A | * | 5/1994 | Gille | 66/207 |
| 5,365,153 | A | * | 11/1994 | Fujita et al. | 318/34 |
| 5,528,114 | A | * | 6/1996 | Tokizaki et al. | 318/67 |
| 5,642,091 | A | * | 6/1997 | Coenen et al. | 340/310.02 |
| 5,712,540 | A | * | 1/1998 | Toda et al. | 318/46 |
| 5,857,496 | A | * | 1/1999 | Brown et al. | 139/110 |
| 6,144,183 | A | * | 11/2000 | Kawai | 318/675 |
| 6,247,503 | B1 | | 6/2001 | Shaw et al. | |
| 6,522,096 | B1 | * | 2/2003 | Roth | 318/568.1 |
| 6,525,496 | B1 | | 2/2003 | Bilcke | |

FOREIGN PATENT DOCUMENTS

EP 0 752 753 A 1/1997

* cited by examiner

*Primary Examiner*—Rina Duda
(74) *Attorney, Agent, or Firm*—Bacon & Thomas PLLC

(57) ABSTRACT

A drive system powering a group of machines each fitted with a rectifying unit, wherein the inputs of the control devices of the machines' drive motors are interconnected by an electrical bus which implements a power exchange. The system enables swapping current from a power supply between motors of different machines.

13 Claims, 5 Drawing Sheets

DRIVE SYSTEM FOR A GROUP OF MACHINES

BACKGROUND OF THE INVENTION

A. Field

The present invention relates to a drive system for a group of machines each equipped with a drive motor connected by control devices to a DC power source.

B. Related Art

Applying DC power to the drive motor(s) of a machine, for instance a weaving machine, is known. In this procedure AC power is converted by a rectifying unit of the particular machine into DC. This DC is applied by controlled switching units to the weaving machine's drive motor. Said drive motor preferably shall be a switched reluctance motor. Preferably such a weaving machine also contains a capacitive energy buffer connected to the output of the rectifying unit and to the input of the switching units. As a result, the power output beyond the rectifying unit may remain nearly constant even when the power applied to the weaving machine's main drive motor varies. The power applied to said main drive motor of a weaving machine varies according to a periodic motion of said weaving machine because it contains components that are moved in one or the other direction at predetermined times.

The above described drive system meets requirements for weaving. However it is less than desirable for electrically decelerating the weaving machine's main drive motor. For example, the main drive motor must be decelerated to reduce its speed during weaving or to stop it. In such a case the energy buffer must store the energy released by electrically decelerating the main motor. Therefore an energy buffer of high capacity and/or ability to tolerate high voltages will be required.

As regards rapidly operating weaving machines, it is nearly impossible to store the total energy released during deceleration into an energy buffer. Either an energy buffer of very large capacity would be needed, or the energy buffer's voltage would be too high. To preclude excessively high energy buffer voltages, it is known in the state of the art to couple a resistor in parallel with the energy buffer when said buffer's voltage becomes excessively high, whereby energy is removed from said buffer and converted into heat in said resistor. When the main drive motor of a weaving machine must be frequently decelerated, there will be danger that the resistor temperature will become excessive. Moreover the heat dissipated by such a resistor must be absorbed by air-conditioning equipment in the weaving room. This aspect again requires expenditure of relative large amounts of energy.

BRIEF SUMMARY OF INVENTION

The objective of the present invention is to improve a drive system of the above cited kind.

This goal is attained in that the electrical power source inputs of the control devices of the drive motors of a group of machines are interconnected by electric lines in order to carry out power swapping.

The drive system of the invention offers the advantage that the portion of the energy which is released during deceleration by one of the machines of a group may be utilized by another machine in said group. In this case any installed energy buffer need absorb less energy and/or any resistor used need not be switched onto said buffer.

In a preferred embodiment of the invention, each machine is fitted with a rectifying unit mounted between an AC power source and the inputs of the particular control devices of said machines. The inputs to the control devices are interconnected, and the rectifying units may cooperate to apply that power, for instance, required to start or to accelerate one of the machines.

In another preferred embodiment of the invention, one energy buffer is allocated to the inputs of the control devices of each machine. In this way the size of the individual energy buffers may be reduced. Using energy buffers of lesser capacity offers the advantage that these shall contain fewer pollutants. Because the energy buffers of the individual machines may swap energy among one other, they operate in the form of the sum of their capacities. As a consequence of being connected to one another, the total capacity of all energy buffers also may be reduced. Furthermore the interconnection of the energy buffers allows drawing on the energy stored in each of them to start or accelerate a machine. In the latter case the rectifying units are not required to apply the full power needed to start or accelerate a machine. Also, using one rectifying unit for each machine, it becomes feasible to keep the power substantially constant from each rectifying unit even when only a smaller energy buffer is used per machine.

In yet another embodiment of the invention, each machine is combined with a resistor connected by switching units to the input of its respective control device and/or its respective energy buffer. When energy must be dissipated as heat, this heat can spread over the individual, switched-on resistors.

In another embodiment of the present invention, one joint resistor is allocated to a group of machines and is connected by switching units to the inputs of the control means. Said single resistor may be installed at a remote location, for instance outside the weaving room. In this manner the heat dissipated by this resistor need not be absorbed by the weaving room's air-conditioning equipment.

In yet another embodiment of the present invention, one joint rectifying unit is mounted between an AC source and the inputs of the control devices of the machines. In this design the power may be applied in part or in whole through the joint rectifying unit which illustratively converts AC into DC with very high efficiency.

In yet another embodiment of the present invention, an inverter is mounted between control devices of the machines of a group and an AC power source. This inverter converting DC into AC allows feeding the energy recovered during deceleration back into the AC power source. While a single inverter suffices for one group of machines, the inverter may be selected as a more elaborate and correspondingly costlier inverter for recuperating said energy instead of converting it into heat by means of simpler and more economical resistors.

In still another embodiment of the present invention, the inputs of the control devices of the group's machines cooperate with one joint energy buffer.

Preferably the rectifying unit(s) shall each be fitted with a semiconductor forming a DC current at a defined source voltage.

In a preferred embodiment of the present invention, the group's machines are weaving machines of which the main drive shafts preferably are each directly coupled to the associated drive shafts of the drive motors.

DESCRIPTION OF THE DRAWINGS

Further features and advantages of the present invention are elucidated in the description below and in relation to the illustrative embodiments shown ion the drawings.

DETAILED DESCRIPTION

Figure 1:
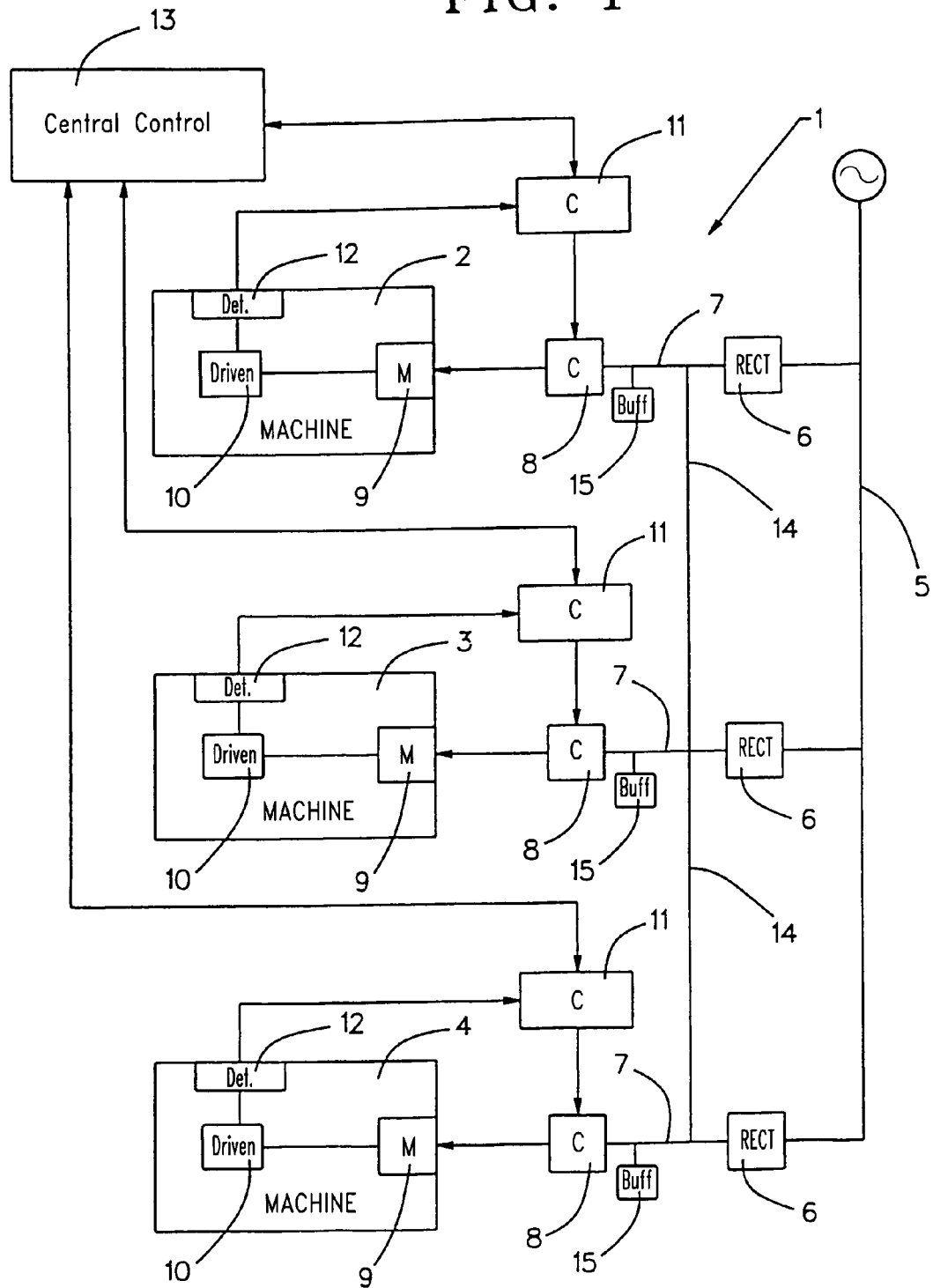
FIG. 1 schematically shows a group of weaving machines equipped with a drive system of the invention, and FIGS. 2–5 schematically shows variants of the drive system of the invention applied to groups of machines.

The drive system 1 of FIG. 1 electrically powers a group of machines 2, 3 and 4 from an AC power source 5. Illustratively the power source 5 is a conventional 380-volt power line at 50 Hz frequency. A rectifying unit 6 is allocated to each machine 2, 3 and 4 converting the AC from the power source 5 into DC. The rectifying units 6 each are connected to the inputs 7 of control devices 8 which apply DC to the particular drive motors 9 of the machines 2, 3 and 4. Each machine 2, 3 and 4 contains at least one component 10 driven in periodic motion, that is, moving in one direction or the other at a given time or being raised or lowered at a given time. The electric drive motor 9 of each of the machines 2, 3 and 4 is correspondingly driven into periodic motion in that appropriately power having a periodic time-function shall be applied in a controlled manner by means of the control devices 8 to the drive motor(s) 9. In particular the time-function of applied power is controlled in a manner such that the torque will be constant.

In this embodiment the drive motor 9 is a switchable reluctance motor and as a result the control devices 8 each are a switching unit. Each machine 2, 3, 4 is fitted with a control unit 11 applying to the control devices 8 (switching units) certain control parameters retrieved from a memory whereby the power is applied in periodic manner to the reluctance motor 9. In this process the switchable reluctance motors 9 are controlled according to the machine angular positions in a motion such that, by means of the control devices 8 (switching units), predetermined windings of the switchable reluctance motor 9 shall be coupled during a predetermined time interval to the output of the rectifying unit 6. The above term "motion" denotes the change in angular position of the switchable reluctance motor 9. In particular this motion is matched to the natural motion of the machine's components.

In the shown embodiment, the machines 2, 3 and 4 each are fitted with an angular-position detector 12 determining the angular position of the main drive shaft of the particular machine 2, 3 and 4. These angular-position detectors 12 of each machine 2, 3 and 4 are coupled to the respective control units 11. In this manner the control devices 8 (switching units) of each machine 2, 3 and 4 can be actuated as a function of the signal from the associated angular-position detector 12 displaying the angular position of the particular machine 2, 3 and 4. Also, it is possible to determine the angular positions of the machines 2, 3 and 4 by determining the angular positions of the respective drive motors 9. As shown in FIG. 1, the control units 11 of the particular machines 2, 3 and 4 also may be connected to a central control unit which for instance is set up remotely from the machines 2, 3 and 4 and which is connected by a network link with the control units 11 of the individual machines.

The patent document WO 98/31856 (see U.S. Pat. No. 6,247,503) discloses a drive motor of which the drive shaft is directly connected to or even is integral with the weaving machine's main drive shaft. The patent document WO 99/27426 (see U.S. Pat. No. 6,525,496) discloses how such a drive motor is powered into a specific motion, namely the power applied to this drive motor is controlled as a function of the angular position of said machine. This driving mode is preferred also with respect to the machines of a group that are driven by the drive system of the invention. For these reasons the contents of the patent document U.S. Pat. No. 6,525,496 are hereby declared to be part of the present application.

The electrical power source inputs 7 of the control devices 8 and hence the outputs of the individual rectifying units 6 of the group of machines 2, 3 and 4 are interconnected by an electric line 14, as a result of which DC can flow between the group's machines 2, 3 and 4 and also may be swapped. Therefore the DC power of one of the rectifying units 6 may pass into the individual machines 2, 3 and 4 of the said group to thereby optimize the power consumption of the motors of the group.

In a preferred embodiment of the invention, each rectifying unit 6 comprises a number of semiconductors which may or may not be controlled, for instance a number of diodes which convert AC into DC with a defined power source voltage. To avoid that one of the rectifying units 6 be excessively loaded, advantageously rectifying units 6 are used that will supply DC of substantially the same voltage. Therefore identical rectifying units 6 will be preferably used for the individual machines 2, 3, 4.

The electric line 14 shall be of sufficient diameter and therefore have sufficiently low impedance so that the power may be transmitted in near lossless manner. With respect to weaving machines, such a line 14 shall supply a power of at least 3 kW without being significantly and constantly heated by that transmission. Illustratively lines of copper of several mm in diameters are appropriate.

In the embodiment of FIG. 1, each machine 2, 3 and 4 contains an electrical energy buffer 15 mounted between the particular output of the rectifying unit 6 and the input 7 of the associated control device 8. Each of said buffers 15 illustratively is in the form of a capacitor which may store and release energy. The energy contained in each energy buffer 15 may be fed to one of the drive motors 9 of one of the machines 2, 3 or 4. The energy released when decelerating a drive motor 9 of one of the machines 2, 3 or 4 also may be fed to one of the energy buffers 15 still able to accept it. This energy storage is not restricted to one energy buffer mounted at one of the particular machines 2, 3 or 4. Consequently any one of the machines 2, 3 or 4 when required to apply peak power may draw energy from the energy buffers 15 and furthermore from the rectifying units 6 of each of the other machines.

The energy released during braking or during deceleration of a particular machine may be fed to another machine of the same group, as a result of which the energy buffer(s) 15 are not required to reabsorb the entirety of the said released energy and/or so that additional resistors dissipating energy into heat will not be needed. This feature is appropriate foremost as regards weaving machines of which the operational rate must be periodically reduced according to a given pattern being woven. Illustratively such shall be the case when weaving in several colors, whereby a given filling must be woven at a lower speed. The energy stored in the energy buffers of such weaving machines must also be available in order to raise again the operational speed of the weaving machine. As regards a weaving machine of which the operational speed varies according to a given pattern, for instance between 1,200 and 900 picks a minute, approximately 3 joules are released in deceleration. This released energy is partly stored in the energy buffers 15 and is partly absorbed by the other machines.

Figure 2:
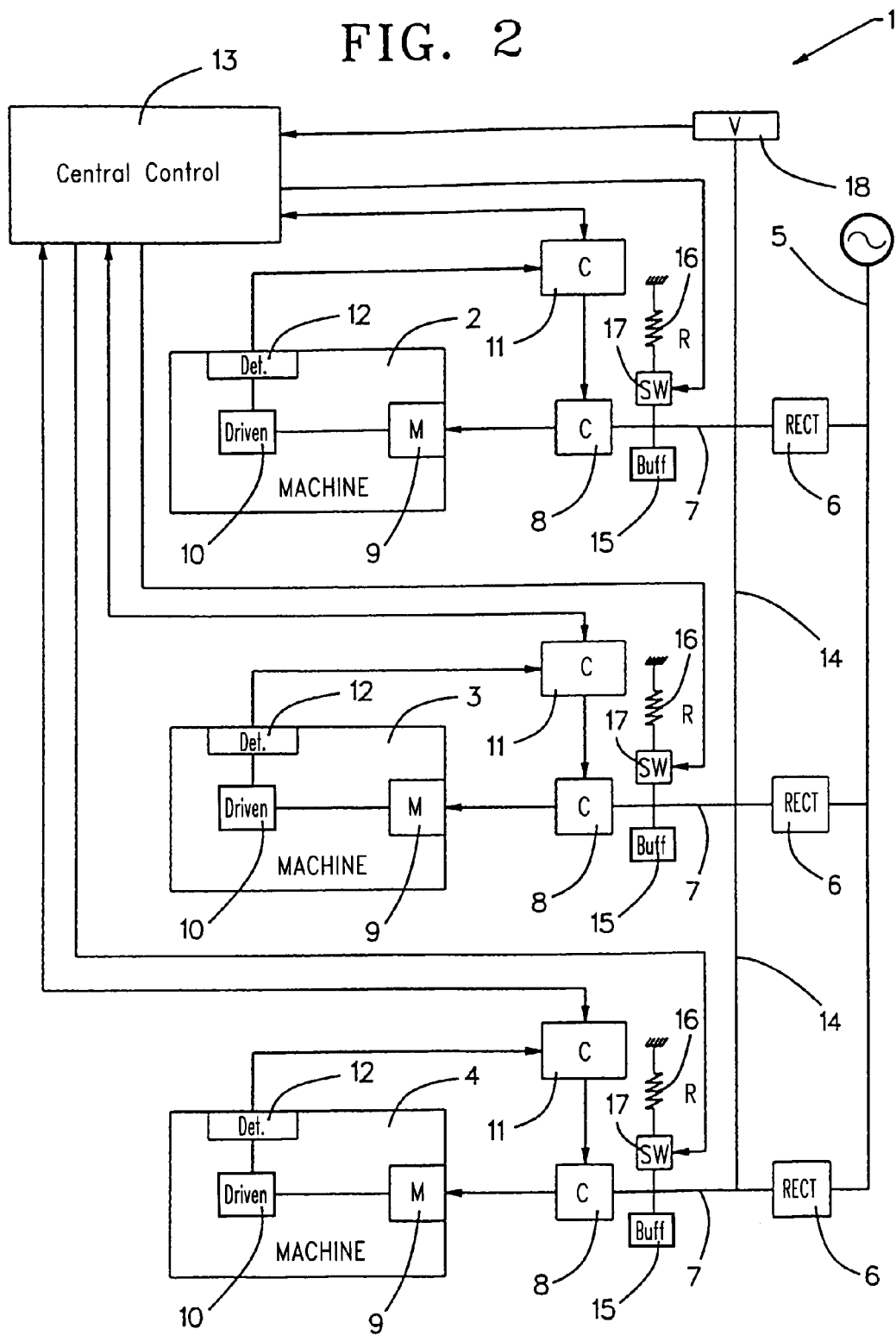

The drive system of the invention only rarely is susceptible to the need of converting released energy into heat by connection to a resistor. However such a case may arise if several machines are to be stopped simultaneously. For the sake of safety and as shown in FIG. 2, a resistor 16 is provided for each machine 2, 3 and 4 and is connected by switching units 17 to the outputs of the rectifying units 6 and to the inputs 7 of the control devices 8. In this manner each resistor 16 is also connected to the energy buffers 15. The switching units 17 are controlled by the central control unit 13. All resistors 16 may be switched ON in the event the voltage of the energy buffers 15 becomes excessive. Such a voltage value is measured by a voltmeter 18 connected to the control unit 13 and to the inputs 7 of the control devices 8. Furthermore temperature sensors hooked up to the control unit 13 may be associated with the resistors 16. In that case and as a function of the temperature of each resistor 16, the control unit 13 may switch ON the resistor 16 at the lowest temperature if the voltage across the energy buffers 15 is excessive.

Figure 3:
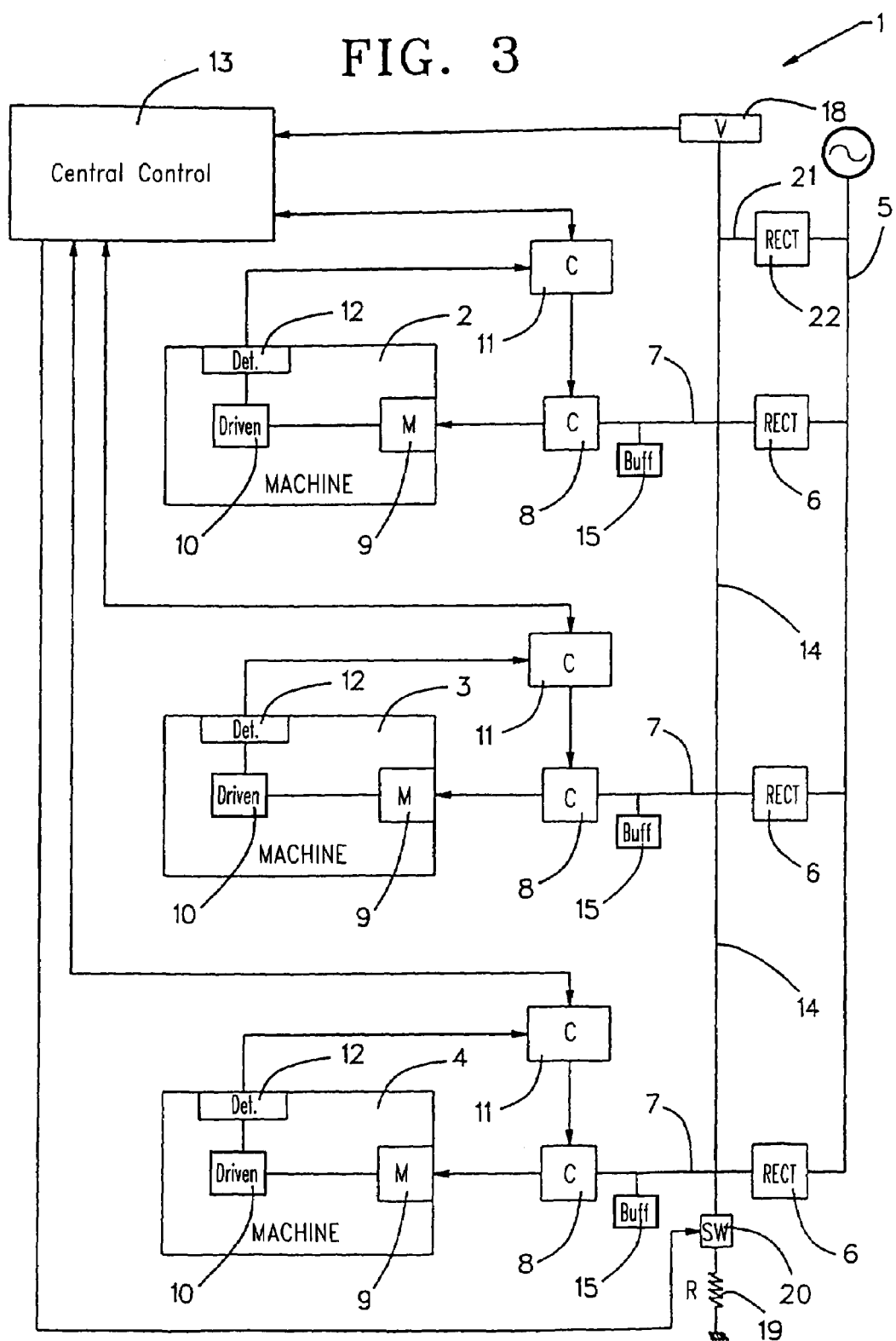

Only one resistor 19 is allocated to the group of machines 2, 3 and 4 in the embodiment mode shown in FIG. 3, and can be coupled by the switching unit 20 with the inputs 7 of the control devices 8 of said machines 2, 3 and 4. Appropriately this single resistor will be mounted outside the room housing the machines 2, 3 and 4, in particular to avoid loading the air-conditioning equipment for that room. The embodiment mode of FIG. 3 furthermore includes a joint rectifying unit 22 of which the output 21 is connected to the line 14 which in turn is connected to the inputs 7 of the control devices 8.

Figure 4:
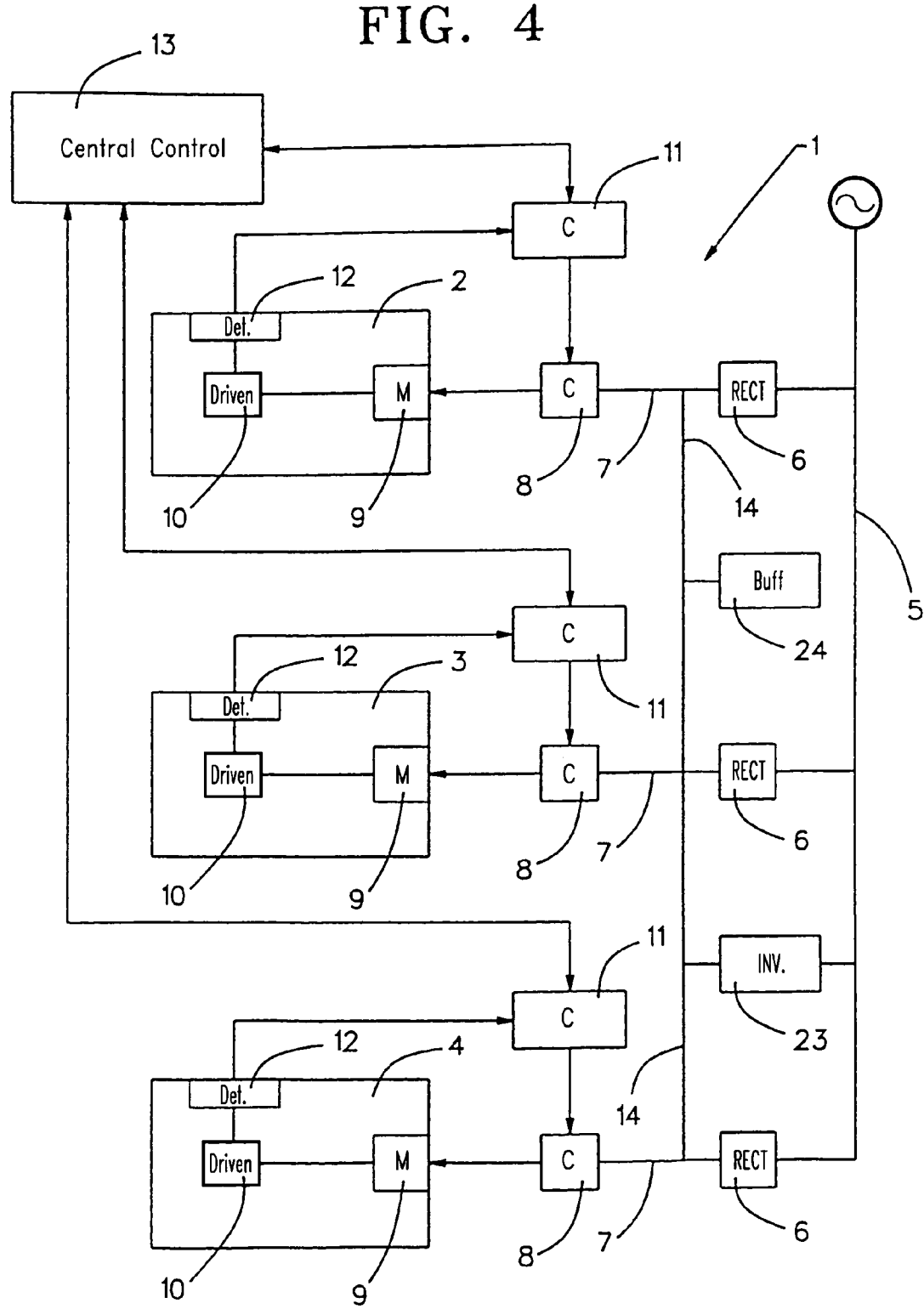

The basic design of FIG. 4 corresponds to that of FIG. 1. However it includes furthermore an inverter 23 which upon voltages at the inputs 7 of the control devices 8 being reached or exceeded, will convert DC into AC that shall be fed into the AC power source 5. This inverter 23 is configured between the inputs 7 of the control devices 8 and the AC power source 5. In such a design, the resistors 16 and/or 19 may be eliminated. As regards a drive system 1 of the invention, the eventuality of having to feed power back into the power source 5 is remote. Accordingly a relatively small inverter 23 may be used, that is, one which may be smaller than if each machine 2, 3, 4 were fitted with an inverter and required to feed back energy being released at that machine.

A joint energy buffer 24 in FIG. 4 replaces the previous individual energy buffers 15 and is connected both to the inputs 7 of the control devices 8 and to the outputs of the rectifying units 6.

Figure 5:
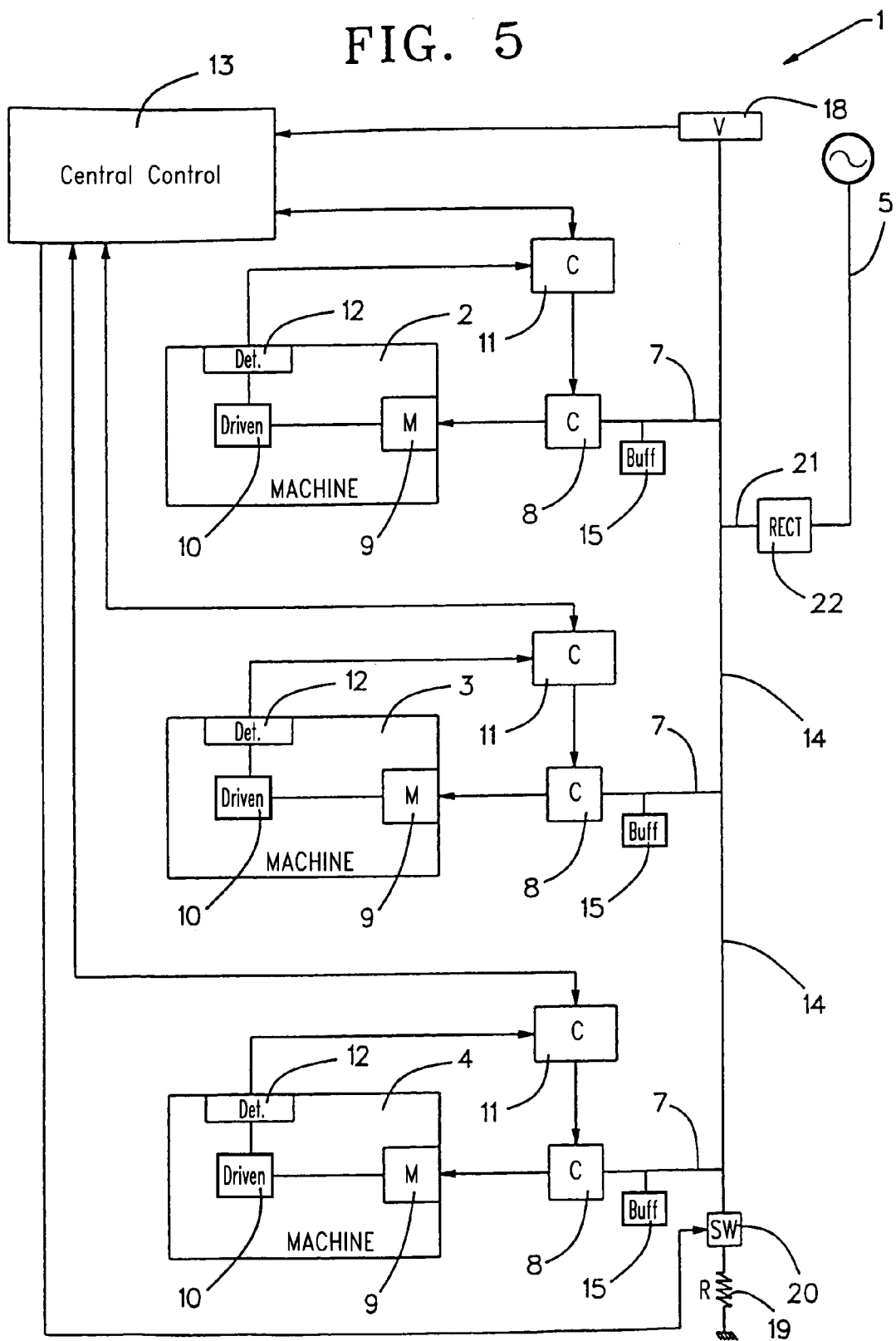

The embodiment of FIG. 5 substantially corresponds to that of FIG. 3. However in this latter embodiment, the machines 2, 3 and 4 are not fitted with their own rectifying unit 6. Instead a centrally located rectifying unit 22 is connected between the AC power source 5 and the line 14. The output 21 of rectifying unit 22 is connected to the line 14 connecting the inputs 7 of the control devices 8.

Obviously the invention is not restricted to a group of three machines 2, 3, 4. At least two machines are needed. However the invention's advantages shall be greater the more machines belonging to one group are serviced by the drive system of the invention.

In the shown and above discussed embodiments, each machine 2, 3,4 is fitted with only one drive motor 9. However several drive motors may be used for each machine to drive specific components of that machine. The power applied from the power source to the individual drive motors may be considered equivalent to one equivalent power applied to a single fictitious drive motor of the particular machine.

The individual embodiments discussed above also may be combined within the scope of the present invention. Machines other than weaving machines also are applicable, that are powered and decelerated by a drive motor, for instance compressors equipped with an electric drive motor.

As regards the drive systems of FIGS. 1 through 4, the rectifying units and energy buffers of each machine may be designed for a physical size for an average applied power and for storage of average energy. They need not be designed for storing energy peaks when a machine is being decelerated or to supply peak power when starting a machine. On account of such a compact design, the electric efficiency of each rectifying unit of the group of machines will be improved. The invention also allows limiting the fluctuations in the power to be applied by each rectifying unit, and this feature also improves electrical efficiency.

The drive system of the present invention is especially appropriate for a group of machines of which the central control unit 13 contains means driving the electric drive motors 9 of the group machines 2, 3 and 4 in periodic motions. In an especially advantageous manner, the periodic motions of the individual machines 2, 3 4 of said group will be matched to one another in a manner so as to limit the total power applied to the group of machines 2, 3, 4 at a predetermined limit. In that case said value illustratively shall be a maximum value and/or a maximum change of the total applied power. The power applied to the drive motors 9 of the individual machines 2, 3, 4 can be controlled in a way disclosed in the patent document WO 99/27426 (U.S. Pat. No. 6,525,496), wherein additionally the motions of the individual machines are matched to each other, for instance by the central control unit 13, for instance being phase-shifted. This feature can be implemented by controlling the mutual angular positions of the various machines. In other words, the particular motion of one machine will be matched to the motions of the other machines in a way that the instant at which one machine absorbs maximum power will not coincide with the instant at which another machine of the group also absorbs maximum power. As a result, the power applied by each rectifying unit may be kept nearly constant even when using a comparatively small energy buffer for each machine.

The invention offers the further advantage that a single machine together with its rectifying unit 6 and any energy buffer 15 and/or any resistance 16 that might be associated to it will work well per se, but, on account of the line 14 in the group, will operate even more efficiently. For that purpose and as regards the embodiments of FIGS. 1 through 4, not only are lines provided for the AC power source 5 between the individual machines, but also lines 14 for DC.

The invention also applies to a group of machines that are not decelerated using electric drive motors. In that case the invention is advantageous to start a machine, in particular if driven in periodic motions.

However the drive system of the invention is especially appropriate for weaving machines. It allows improving electrical efficiency of a group of weaving machines and therefore is substantially advantageous for weaving mills.

The apparatus of the invention is not restricted to the shown and described embodiments. Further modifications may be resorted to within the scope of the invention.

The invention claimed is:

1. A drive system comprising a group of separate weaving machines having respective components driven in periodic motion resulting in varying power consumption by each machine during each machine cycle, each machine including a drive motor connected by a control device to a rectifier providing a DC power source from an AC power supply, each drive motor controlled and powered to deliver torque such that the power required by each motor varies during a machine cycle, and wherein the DC power source inputs of the control devices of the drive motors of the machines of said group are interconnected by electrical lines in a manner enabling swapping DC power source current by said electrical lines whereby energy not required by a drive motor of one machine can be shifted to other drive motors of the other machines as needed to optimize the total power consumption by said drive motors of all machines.

2. Drive system as claimed in claim 1, wherein each machine contains a rectifying unit disposed between the AC supply and the electrical power source input of the respective control device of each said machines.

3. Drive system as claimed in claim 1, wherein a single energy buffer is associated with each of the DC power source inputs of the control device of each one of said machines.

4. Drive system as claimed in claim 1, wherein a single joint rectifying unit is configured between the AC power supply and the DC power inputs of the control devices of the machines of the group.

5. Drive system as claimed in claim 1, wherein a single joint energy buffer is allocated to the DC power source inputs of the control devices of the machines of the group.

6. Drive system as claimed in claim 1, wherein each said at least one rectifier is fitted with a semiconductor forming a DC power supply having a predetermined output voltage.

7. Drive system as claimed in claim 1, wherein the machines of said group are weaving machines.

8. Drive system as claimed in claim 1, wherein at least a main drive shaft of each weaving machine is directly connected to an output drive shaft of each respective drive motor.

9. A drive system comprising a group of machines, each machine including a drive motor connected by a control device to a DC power source, wherein electrical power source inputs of the control devices of the drive motors of the machines of said group are interconnected by electrical lines in a manner enabling swapping electrical power source current by said electrical lines; and a joint resistor is associated with the group of machines and is connected through a switching unit to the electrical power source inputs of the control devices of the machines.

10. A drive system comprising a group of machines, each machine including a drive motor connected by a control device to a DC power source wherein electrical power source inputs of the control devices of the drive motors of the machines of said group are interconnected by electrical lines in a manner enabling swapping electrical power source current by said electrical lines; and an inverter is provided between the control devices of the machines of the group and an AC power source.

11. A drive system comprising a group of separate machines, each machine including a drive motor connected by a control device to rectifier providing a DC power source from an AC power supply, wherein electrical power source inputs of the control devices of the drive motors of the machines of said group are interconnected by electrical lines in a manner enabling swapping electrical power source current by said electrical lines; and wherein a joint resistor is associated with the group of machines and is connected through a switching unit to the electrical power source inputs of the control devices of the machines.

12. A drive system comprising a group of separate machines, each machine including a drive motor connected by a control device to rectifier providing a DC power source from an AC power supply, wherein electrical power source inputs of the control devices of the drive motors of the machines of said group are interconnected by electrical lines in a manner enabling swapping electrical power source current by said electrical lines, wherein a single resistor is associated with each machine and is connected through a switching unit to the electrical power source input of a respective control device and a respective energy buffer.

13. A drive system comprising a group of separate machines, each machine including a drive motor connected by a control device to rectifier providing a DC power source from an AC power supply, wherein electrical power source inputs of the control devices of the drive motors of the machines of said group are interconnected by electrical lines in a manner enabling swapping electrical power source current by said electrical lines, wherein a single resistor is associated with each machine and is connected through a switching unit to a respective energy buffer.

* * * * *